US008964249B2

(12) United States Patent
Kawamoto et al.

(10) Patent No.: US 8,964,249 B2
(45) Date of Patent: Feb. 24, 2015

(54) IMAGE TEST APPARATUS, IMAGE TEST SYSTEM, AND IMAGE TEST METHOD FOR TESTING A PRINT IMAGE BASED ON MASTER IMAGE DATA

(75) Inventors: Hiroyuki Kawamoto, Kanagawa (JP); Tadashi Kitai, Kanagawa (JP); Hitomi Kaneko, Saitama (JP); Keiji Kojima, Kanagawa (JP); Hiroyoshi Ishizaki, Kanagawa (JP); Keiichi Miyamoto, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 163 days.

(21) Appl. No.: 13/544,213

(22) Filed: Jul. 9, 2012

(65) Prior Publication Data

US 2013/0016374 A1 Jan. 17, 2013

(30) Foreign Application Priority Data

Jul. 14, 2011 (JP) ................................ 2011-156066

(51) Int. Cl.
*G06F 15/00* (2006.01)
*G03G 15/00* (2006.01)
*G03G 15/08* (2006.01)

(52) U.S. Cl.
CPC ........ *G03G 15/6585* (2013.01); *G03G 15/5025* (2013.01); *G03G 2215/00569* (2013.01); *G03G 2215/00805* (2013.01)
USPC .............. 358/1.9; 358/3.01; 358/504; 399/27

(58) Field of Classification Search
None
See application file for complete search history.

(56) References Cited

U.S. PATENT DOCUMENTS 6,473,197 B1 10/2002 Shimazaki
7,206,002 B2 4/2007 Kawamoto
7,327,495 B2 2/2008 Kawamoto et al.
8,086,124 B2 * 12/2011 Zaima ............................ 399/53
8,139,897 B2 3/2012 Kojima
8,554,092 B2 * 10/2013 Tanaka ............................ 399/45
8,736,900 B2 * 5/2014 Shiozawa ....................... 358/1.9
2005/0052488 A1 3/2005 Inoue
2005/0275911 A1 * 12/2005 Yamada et al. ............... 358/518
2005/0280849 A1 12/2005 Kojima et al.
2006/0198660 A1 9/2006 Bessho
2007/0127940 A1 6/2007 Zaima
2010/0238509 A1 * 9/2010 Ogawa ......................... 358/3.06
2011/0134458 A1 6/2011 Kojima et al.

FOREIGN PATENT DOCUMENTS

EP 0 820 188 A2 1/1998
EP 1 804 130 A1 7/2007
JP 04-296194 * 10/1992
JP 2005-234251 9/2005
JP 2006-178043 7/2006
JP 2007-148027 6/2007
JP 2008-97319 4/2008
JP 4301020 5/2009
JP 2009-124519 6/2009
JP 4407588 11/2009
JP 2010-165011 7/2010

OTHER PUBLICATIONS

Extended European Search Report issued Nov. 26, 2012 in Patent Application No. 12176130.8.

* cited by examiner

*Primary Examiner* — Steven Kau
(74) *Attorney, Agent, or Firm* — Oblon, Spivak, McClelland, Maier & Neustadt, L.L.P.

(57) ABSTRACT

An image test apparatus includes a color-image-data acquiring unit that acquires color image data being data of an image to be formed with a color material; a master-image-data generating unit that converts the color image data depending on transparent image data being data of an image to be formed with a transparent color material, thereby generating master image data; and an image testing unit that tests, using the master image data, a test image data which is generated by optically reading a print image from a printed matter on which the print image based on the color image data and the transparent image data has been printed.

12 Claims, 11 Drawing Sheets

IMAGE TEST APPARATUS, IMAGE TEST SYSTEM, AND IMAGE TEST METHOD FOR TESTING A PRINT IMAGE BASED ON MASTER IMAGE DATA

CROSS-REFERENCE TO RELATED APPLICATIONS

The present application claims priority to and incorporates by reference the entire contents of Japanese Patent Application No. 2011-156066 filed in Japan on Jul. 14, 2011.

BACKGROUND OF THE INVENTION

1. Field of the Invention

The present invention relates to an image test apparatus, an image test system, and an image test method.

2. Description of the Related Art

In recent years, on-demand printing has been put to practical use and there is an increasing demand to test an image on a printed matter. For example, Japanese Patent No. 4407588 discloses an image test system that tests a test target including a printed matter on the basis of a master image.

Meanwhile, a printing technology has recently been developed to perform printing by using a transparent color in addition to a normal color. However, if a test is performed by using the image test system as described above, the accuracy of the test is reduced.

Therefore, there is a need to provide an image test apparatus, an image test system, and an image test method capable of preventing reduction in the accuracy of a test even when the test is performed on a printed matter which is printed while using a transparent color.

SUMMARY OF THE INVENTION

It is an object of the present invention to at least partially solve the problems in the conventional technology.

An image test apparatus includes: a color-image-data acquiring unit that acquires color image data being data of an image to be formed with a color material; a master-image-data generating unit that converts the color image data depending on transparent image data being data of an image to be formed with a transparent color material, thereby generating master image data; and an image testing unit that tests, using the master image data, a test image data which is generated by optically reading a print image from a printed matter on which the print image based on the color image data and the transparent image data has been printed.

An image test system includes: an image forming apparatus that includes a color-image-data generating unit that generates color image data being data of an image to be formed with a color material; a transparent-image-data generating unit that generates transparent image data being data of an image to be formed with a transparent material; and a printing unit that prints a print image on a recording medium based on the color image data and the transparent image data, thereby generating a printed matter; and an image test apparatus that includes a color-image-data acquiring unit that acquires the color image data; a master-image-data generating unit that converts the color image data depending on the transparent image data, thereby generating a master image data; an image reading unit that optically reads the print image from the printed matter, thereby generating a test image data; and an image testing unit that tests the test image data using the master image data.

An image test method includes: acquiring, by a color-image-data acquiring unit, color image data being data of an image to be formed with a color material; generating, by a master-image-data generating unit, a master image data by converting the color image data depending on transparent image data being data of an image to be formed with a transparent color material; and testing, by an image testing unit, a test image data which is generated by optically reading a print image from a printed matter on which the print image based on the color image data and the transparent image data has been printed, using the master image data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the present invention will be explained in detail below with reference to the accompanying drawings.

First Embodiment

A configuration of an image test system according to a first embodiment will be explained below.

Figure 1:
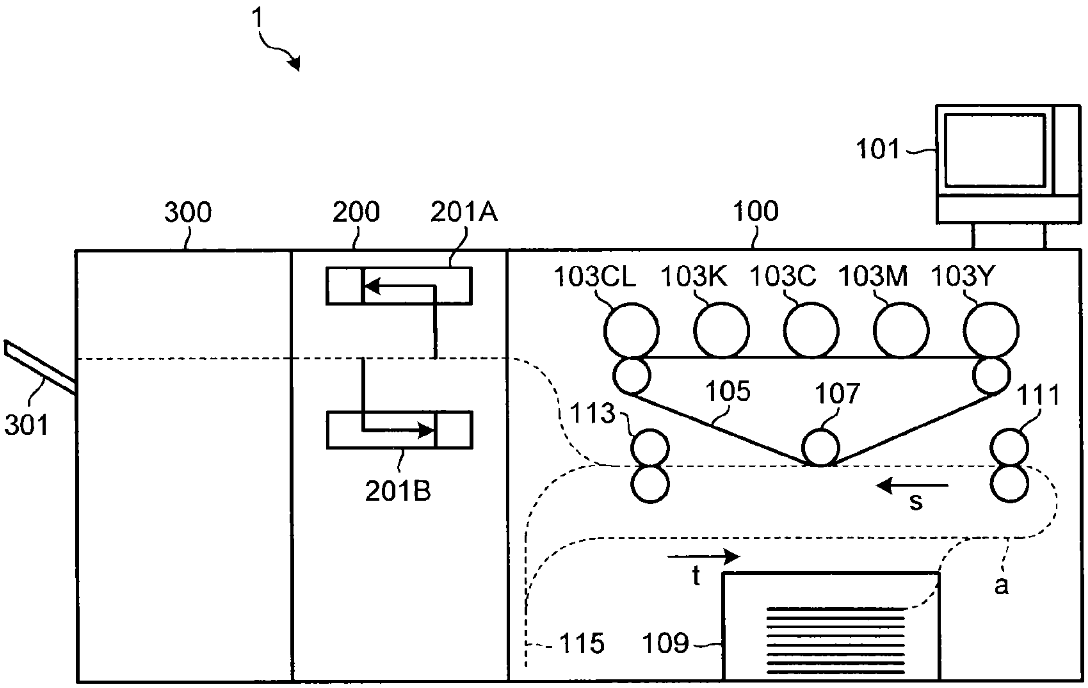
FIG. 1 is a schematic diagram illustrating an example of an image test system according to a first embodiment.

FIG. 1 is a schematic diagram illustrating an example of an image test system 1 according to the first embodiment. As illustrated in FIG. 1, the image test system 1 includes a printer 100, an image test apparatus 200, and a stacker 300.

The printer 100 includes an operation panel 101, photosensitive drums 103Y, 103M, 103C, 103K, and 103CL, a transfer belt 105, a secondary transfer roller 107, a sheet feed unit 109, a conveying roller pair 111, a fixing roller 113, and a reverse path 115.

The operation panel 101 is an operation display unit to make input for various operations to the printer 100 and display various screens.

Each of the photosensitive drums 103Y, 103M, 103C, 103K, and 103CL is subjected to an image forming process (a charging process, an exposing process, a developing process, a transfer process, and a cleaning process) to have a toner image formed, and transfers the formed toner image onto the transfer belt 105. In the present embodiment, a yellow toner image is formed on the photosensitive drum 103Y, a magenta toner image is formed on the photosensitive drum 103M, a cyan toner image is formed on the photosensitive drum 103C, a black toner image is formed on the photosensitive drum 103K, and a clear toner image is formed on the photosensitive drum 103CL; however, it is not limited thereto.

The transfer belt 105 transfers the toner images (a full-color toner image), which are transferred from the photosensitive drums 103Y, 103M, 103C, 103K, and 103CL in a superimposed manner, to a secondary transfer position of the secondary transfer roller 107. In the present embodiment, the yellow toner image is first transferred on the transfer belt 105, and thereafter, the magenta toner image, the cyan toner image, the black toner image, and the clear toner image are sequentially transferred in a superimposed manner; however, it is not limited thereto.

The sheet feed unit 109 houses a plurality of sheets of paper (an example of a recording medium) in a stacked manner, and feeds the sheets.

The conveying roller pair 111 conveys a sheet fed by the sheet feed unit 109 in the direction of arrow s on a conveying path a.

The secondary transfer roller 107 collectively transfers the toner images or the full-color toner image conveyed by the transfer belt 105 onto the sheet conveyed by the conveying roller pair 111 at the secondary transfer position.

The fixing roller 113 applies heat and pressure to the sheet onto which the full-color toner image is transferred, thereby fixing the full-color toner image to the sheet.

In the case of one-side printing, the printer 100 discharges the sheet with the fixed full-color toner image to the image test apparatus 200. In the case of two-sided printing, the printer 100 conveys the sheet with the fixed full-color toner image to the reverse path 115.

The reverse path 115 causes the conveyed sheet to be switched back such that the front side and the back side of the sheet are inverted and the sheet is conveyed in the direction of arrow t. The sheet conveyed via the reverse path 115 is conveyed again by the conveying roller pair 111, the secondary transfer roller 107 transfers a full-color tonner image on the side of the sheet opposite to the side in the previous time, the fixing roller 113 fixes the image to the sheet, and the sheet is discharged to the image test apparatus 200.

The image test apparatus 200 includes image reading units 201A and 201B. The image reading unit 201A optically reads one side of the sheet discharged by the printer 100. The image reading unit 201B optically reads the other side of the sheet discharged by the printer 100. The image test apparatus 200 discharges the read sheet to the stacker 300.

The stacker 300 includes a tray 301. The stacker 300 stacks the sheet discharged by the image test apparatus 200 on the tray 301.

Figure 2:
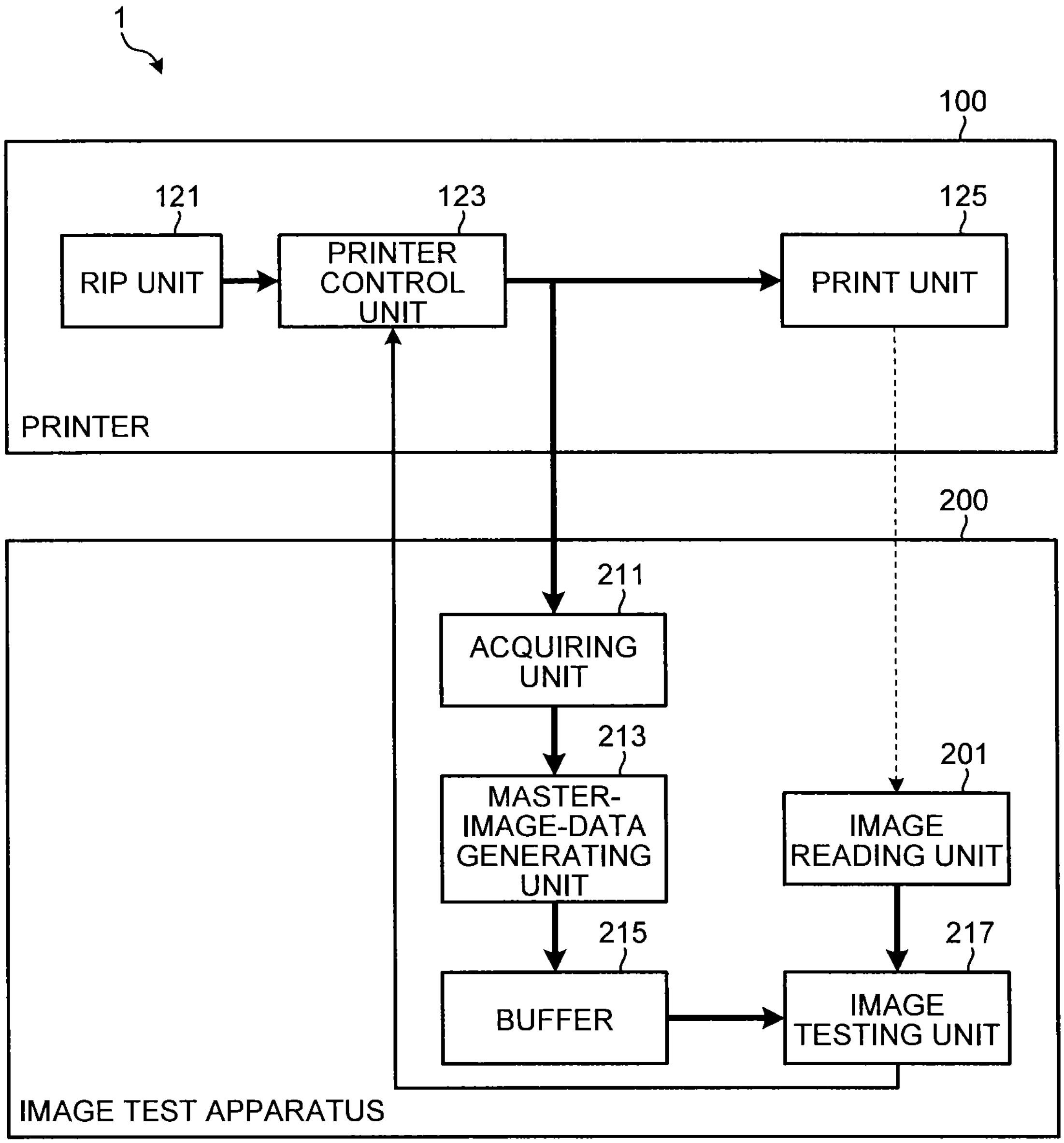
FIG. 2 is a block diagram of a configuration example of a printer and an image test apparatus according to the first embodiment.

FIG. 2 is a block diagram of a configuration example of the printer 100 and the image test apparatus 200 according to the first embodiment. As illustrated in FIG. 2, the printer 100 includes a raster image processor (RIP) unit 121, a printer control unit 123, and a print unit 125. The image test apparatus 200 includes an image reading unit 201, an acquiring unit 211, a master-image-data generating unit 213, a buffer 215, and an image testing unit 217.

The RIP unit 121 receives print data from an external apparatus, such as a host device, and generates, from the received print data, color image data, which is data of an image to be formed with a color material, and transparent image data, which is data of an image to be formed with a transparent material. Specifically, the RIP unit 121 performs a RIP process on the print data to generate the color image data and the transparent image data. At this time, the RIP unit 121 may generate attribute information indicating the attribute of the transparent image data. The attribute information is, for example, information indicating the type of processing using a clear toner.

In the present embodiment, the print data contains data written in a page description language (PDL), such as PostScript (registered trademark), or image data in a tagged image file format (TIFF); however, it is not limited thereto. In the present embodiment, the color image data is CMYK RIP image data, in which each RIP image data of C (cyan), M (magenta), Y (yellow), or K (black) is formed of pixels each represented by 1 bit and is 600 dpi; however, it is not limited thereto. Similarly, in the first embodiment, the transparent image data is RIP image data of clear, in which RIP image data of CLR (clear) is formed of pixels each represented by 1 bit and is 600 dpi; however, it is not limited thereto.

The printer control unit 123 transmits the color image data and the transparent image data generated by the RIP unit 121 to the image test apparatus 200 and the print unit 125. The printer control unit 123 may transmit the attribute information instead of the transparent image data to the image test apparatus 200 when the RIP unit 121 generates the attribute information. Furthermore, for example, the printer control unit 123 gives, to the stacker 300, a designation of a discharge destination of a printed matter that has failed the image test, marks the printed sheet that has failed the image test, or instructs the print unit 125 to perform substitute printing, using result of the image test transmitted by the image test apparatus 200.

The print unit 125 (an example of a printing unit) performs a printing processing process, such as an image forming process, to print a print image on a sheet based on the color image data and the transparent image data, thereby generating a printed sheet. In the present embodiment, the print unit 125 is realized by the photosensitive drums 103Y, 103M, 103C, 103K, and 103CL, the transfer belt 105, the secondary transfer roller 107, and the fixing roller 113; however, it is not limited thereto. In this manner, in the present embodiment, an image is printed by using an electrophotographic method; however, it is not limited thereto. It may be possible to print an image using an inkjet method.

The image reading unit 201 optically reads a print image from a printed matter on which the print image which is based on the color image data and the transparent image data is printed, and generates test image data. In the present embodiment, the image reading unit 201 is realized by the image reading units 201A and 201B. In the present embodiment, the test image data is RGB image data, in which each image data of R, G, or B is formed of pixels each represented by 8-bit and is 200 dpi; however, it is not limited thereto.

The acquiring unit 211 (an example of a color-image-data acquiring unit, a transparent-image-data acquiring unit, or an attribute-information acquiring unit) acquires the color image data and the transparent image data from the printer 100. The acquiring unit 211 acquires the attribute information when the attribute information is transmitted from the printer 100 instead of the transparent image data.

The master-image-data generating unit 213 converts the color image data acquired by the acquiring unit 211, on the basis of the transparent image data acquired by the acquiring unit 211, thereby generating master image data. Specifically, the master-image-data generating unit 213 converts the color image data depending on the transparent image data to generate the master image data.

Figure 3:
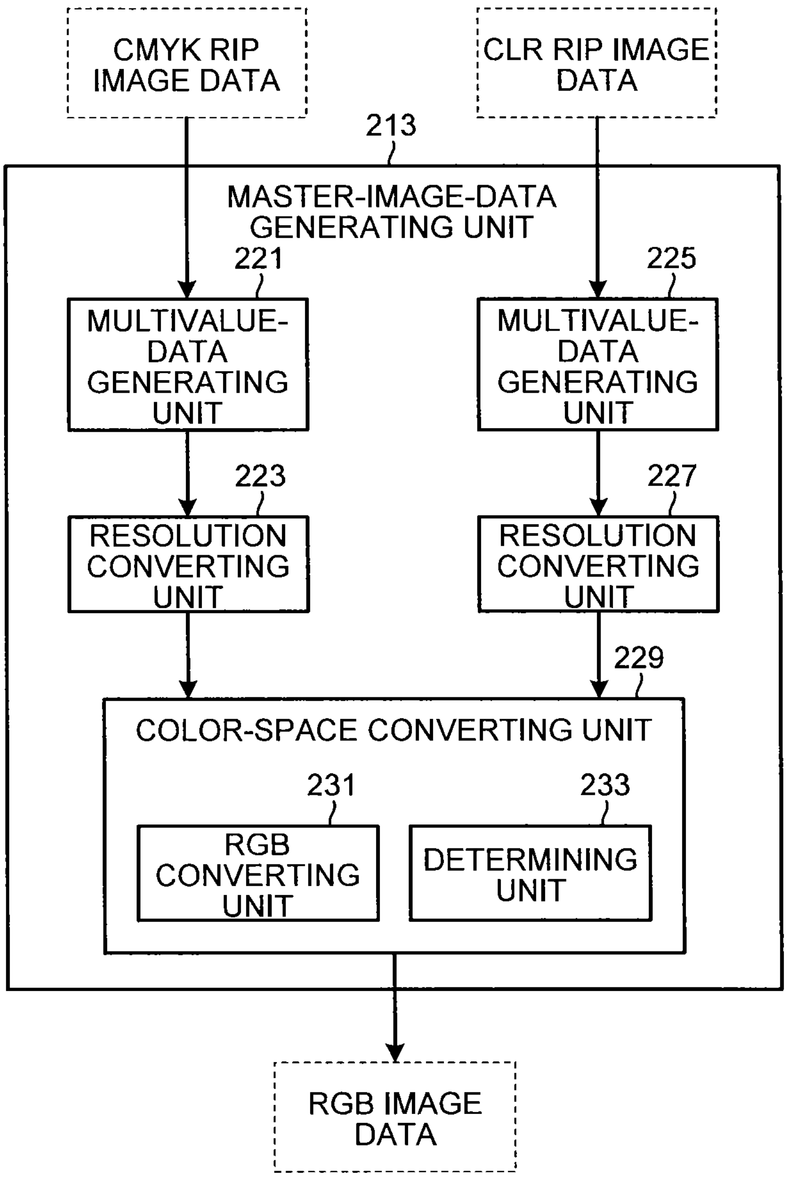
FIG. 3 is a block diagram of a detailed configuration example of a master-image-data generating unit according to the first embodiment.

FIG. 3 is a block diagram of a detailed configuration example of the master-image-data generating unit 213 according to the first embodiment. As illustrated in FIG. 3, the master-image-data generating unit 213 includes a multivalue-data generating unit 221, a resolution converting unit 223, a multivalue-data generating unit 225, a resolution converting unit 227, and a color-space converting unit 229.

The multivalue-data generating unit 221 converts each RIP image data of C, M, Y, or K from data, in which each pixel is represented by 1 bit, to multivalue data, in which each pixel is represented by of 8 bits. In the present embodiment, the multivalue-data generating unit 221 converts data to multivalue data using smoothing with a spatial filter having a smoothing coefficient; however, it is not limited thereto. Any method may be used as the method of converting data to multivalue data.

The resolution converting unit 223 converts the resolution of each RIP image data of C, M, Y, or K from 600 dpi to 200 dpi. In the present embodiment, the resolution converting unit 223 converts the resolution by thining out pixels to convert every 3 pixels to 1 pixel; however, it is not limited thereto. Any method may be used as the method for converting the resolution.

The multivalue-data generating unit 225 converts the RIP image data of CLR from data, in which each pixel is represented by 1 bit, to multivalue data, in which each pixel is represented by 8 bits. As a method of converting data to multivalue data by the multivalue-data generating unit 225, it is possible to use the same method as the method of converting data to multivalue data by the multivalue-data generating unit 221.

The resolution converting unit 227 converts the resolution of the RIP image data of CLR from 600 dpi to 200 dpi. As a method of converting the resolution by the resolution converting unit 227, it is possible to use the same method as the method of converting the resolution by the resolution converting unit 223.

The color-space converting unit 229 converts CMYK RIP image data to RGB image data depending on CLR RIP image data. The color-space converting unit 229 includes a RGB converting unit 231 and a determining unit 233.

The RGB converting unit 231 determines an 8-bit RGB value of each pixel corresponding to an 8-bit CMYK value of corresponding pixel, and converts the CMYK RIP image data to RGB image data composed of the determined values. The RGB converting unit 231 obtains the RGB value by performing interpolation calculation using tetrahedral interpolation using eight discrete grid points in respective C, M, Y, and K. According to this, the RGB converting unit 231 can obtain data of a set of RGB values based on parameters at a certain grid point (hereinafter, described as "grid-point parameters") from data of a set of CMYK values. This calculation method enables to reduce the storage capacity of the image test apparatus 200.

The influence of the CLR RIP image data at the time of conversion from the CMYK RIP image data to the RGB image data will be explained below.

Figure 4:
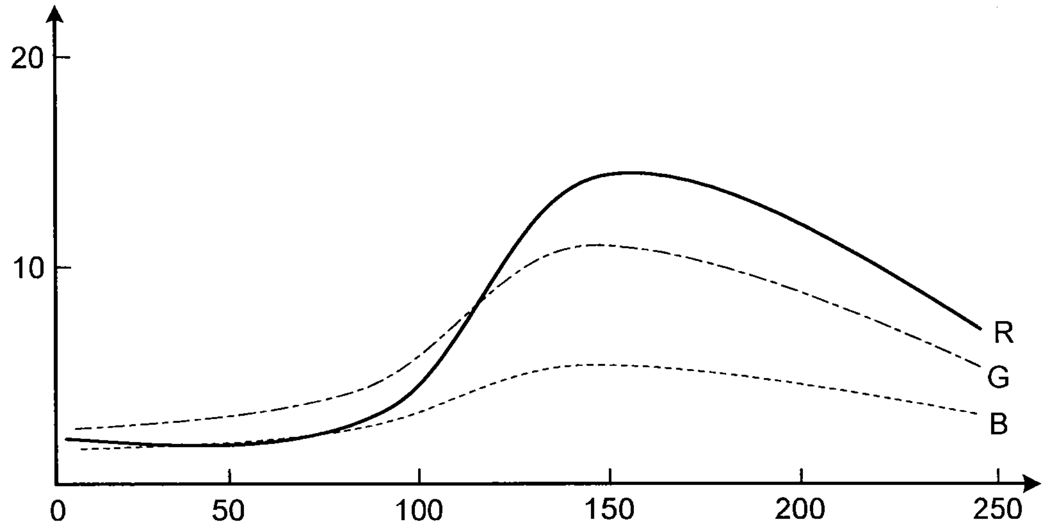
FIG. 4 is a graph illustrating an example of a difference between each of RGB read values, each set of which are determined by an image reading unit by reading one of a plurality of patches having different gradations of cyan color and superimposed with CLR color, and corresponding one of RGB read values, each set of which are determined by the image reading unit by reading one of a plurality of a patches having different gradations of cyan color only.

FIG. 4 is a graph illustrating an example of a difference between each of RGB read values, each set of which are determined by the image reading unit 201 by reading one of a plurality of patches having different gradations of cyan color and superimposed with CLR color, and corresponding one of RGB read values, each set of which are determined by the image reading unit 201 by reading one of a plurality of patches having different gradations of cyan color only. In the example illustrated in FIG. 4, the horizontal axis represents the value of gradations of cyan color of the patches and the vertical axis represents a difference between the RGB read values. Furthermore, a solid line R represents a difference between R read values, a chain line G represents a difference between G read values, and a dashed line B represents a difference between B read values. As illustrated in FIG. 4, the RGB read values differ by a maximum of 15 digits in 255 digit range (near the gradation value of 150) between the patch of cyan color superimposed with CLR color and the patch of only cyan color. While not illustrated in the drawings, the RGB read values not only for cyan color but also for magenta color, yellow color, or black color vary depending on whether CLR color is present or absent.

In this way, the RGB read values of the test image data generated by the image reading unit 201 vary depending on whether CLR color is superimposed or not. The RGB image data converted by the RGB converting unit 231 is used as master image data in an image test performed on test image data by the image testing unit 217 as described later. Therefore, the RGB converting unit 231 needs to convert the CMYK RIP image data to the RGB image data while taking the influence of the CLR RIP image data into account.

Therefore, in the present embodiment, the RGB converting unit 231 obtains data of a set of RGB values based on grid-point parameters according to a determination result obtained by the determining unit 233 described later, from data of a set of CMYK values. Specifically, when CLR color is superimposed, the RGB converting unit 231 receives from the determining unit 233 grid-point parameters in a case where CLR color is superimposed, and obtains data of a set of RGB values based on the grid-point parameters from data of a set of CMYK values. On the other hand, when CLR color is not superimposed, the RGB converting unit 231 receives from the determining unit 233 grid-point parameters in a case where CLR color is not superimposed, and obtains data of a set of RGB values based on the grid-point parameters from data of a set of CMYK values. Thereby, the RGB converting unit 231 can convert the CMYK RIP image data to the RGB image data while taking the influence of the CLR color into account.

Referring back to FIG. 3, the determining unit 233 determines whether clear color is present or absent in the test image data by using the CLR RIP image data. At this time, the determining unit 233 holds grid-point parameters in a case where CLR color is superimposed and grid-point parameters in a case where CLR color is not superimposed. When determining that clear color is not used in the test image data, the determining unit 233 outputs the grid-point parameters in a case where CLR color is not superimposed, to the RGB converting unit 231. When determining that clear color is used in the test image data, the determining unit 233 outputs the grid-point parameters in a case where CLR color is superimposed, to the RGB converting unit 231.

Figure 5:
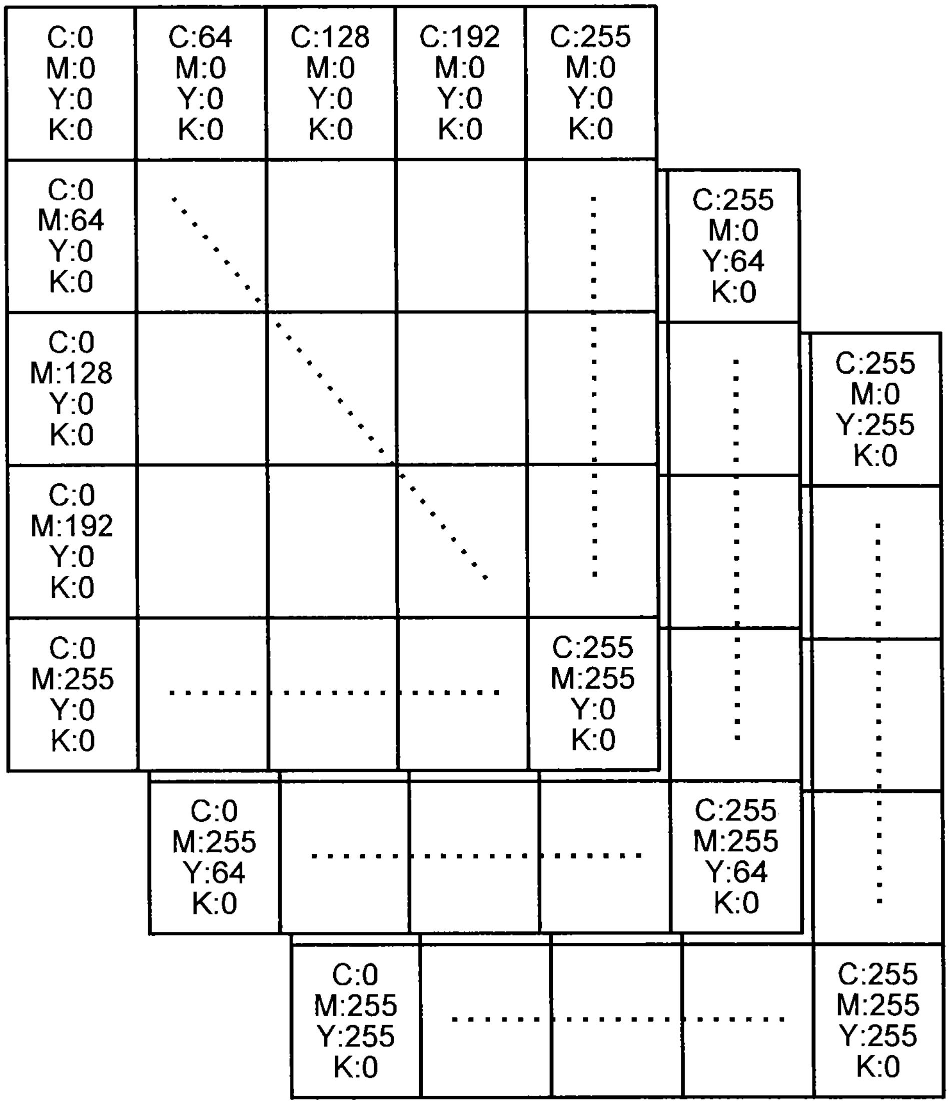
FIG. 5 is a diagram illustrating an example of normal mixed-color patches, to which densities of CMYK different between the patches are assigned.

The grid-point parameters in a case where CLR color is not superimposed is obtained by causing the printer 100 to print normal twenty-five mixed-color patches, to which densities of CMYK different between the pathes are assigned, to sheets of paper and causing the image reading unit 201 to read the sheets of paper having the twenty-five mixed-color patches formed. FIG. 5 illustrates an example of the normal mixed-color patches, to which densities of CMYK different between the patches are assigned. Similarly, the grid-point parameters in a case where CLR color is superimposed is obtained by causing the printer 100 to print twenty-five gloss patches, each of which has been subjected to gloss processing using a clear toner, to sheets of paper and causing the image reading unit 201 to read the sheets of paper having the twenty-five gloss patches formed.

Referring back to FIG. 2, the buffer 215 stores therein the master image data generated by the master-image-data generating unit 213. When the image reading unit 201 generates the test image data, the buffer 215 outputs master image data to be used for a test to the image testing unit 217.

The image testing unit 217 tests the test image data generated by the image reading unit 201 using the master image data output from the buffer 215. The image testing unit 217 transmits a test result to the printer 100.

An operation of the image test system according to the first embodiment will be explained below.

Figure 6:
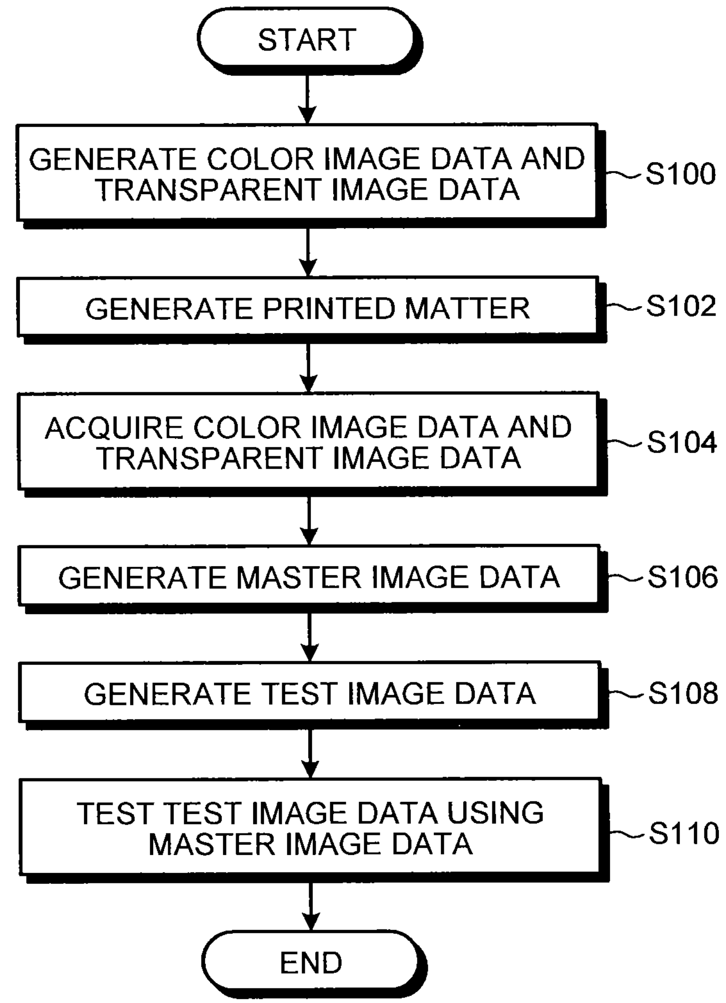
FIG. 6 is a flowchart of an example of an image test process performed by the image test system according to the first embodiment.

FIG. 6 is a flowchart of an example of an image test process performed by the image test system 1 according to the first embodiment.

First, the RIP unit 121 performs a RIP process on print data to generate color image data and transparent image data (Step S100).

Subsequently, the print unit 125 performs a printing process, such as an image forming process, to print a print image based on the color image data and the transparent image data on a sheet of paper, thereby generating a printed matter (Step S102).

Subsequently, the acquiring unit 211 acquires the color image data and the transparent image data from the printer 100 (Step S104).

Subsequently, the master-image-data generating unit 213 converts the color image data depending on the transparent image data, thereby generating master image data (Step S106).

Subsequently, the image reading unit 201 optically reads the print image from the printed matter, on which the print image based on the color image data and the transparent image data is printed, thereby generating test image data (Step S108).

Subsequently, the image testing unit 217 tests test image data using the master image data (Step S110).

As described above, according to the first embodiment, the master image data is generated while taking presence or absence of clear data into account. Therefore, even when the image test is performed on a printed matter which is printed while using clear color, it is possible to prevent reduction in the test accuracy, enabling to perform the image test with higher accuracy.

Second Embodiment

In a second embodiment, a case will be explained that the master image data is generated depending on a way of processing using a clear toner. In the following, a difference from the first embodiment will be mainly explained while components having functions similar to those of the first embodiment are denoted by the same names or the same symbols and explanation of such components will be omitted.

Figure 7:
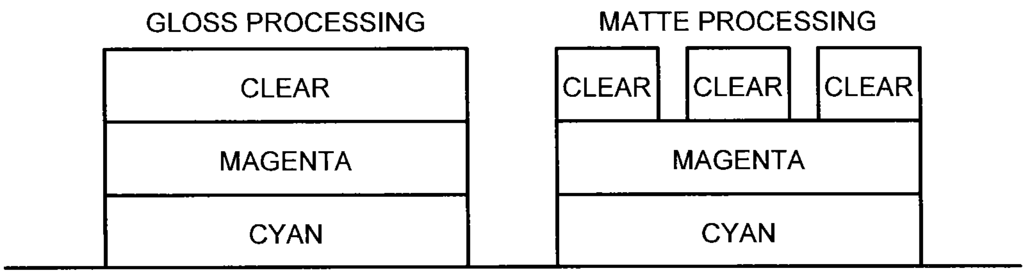
FIG. 7 is a diagram illustrating an example of processing using a clear toner according to a second embodiment.

FIG. 7 is a diagram illustrating an example of ways of processing using a clear toner according to the second embodiment. As illustrated in FIG. 7, in the present embodiment, gloss processing or matte processing is performed as processing using a clear toner; however, it is not limited thereto. Other processing may be performed as the processing using the clear toner.

As illustrated in FIG. 7, the gloss processing is processing of uniformly superimposing a layer of a clear toner on a layer of a color toner (a yellow toner, a magenta toner, a cyan toner, or a black toner) such that the toner surface after fixing becomes smooth. The matte processing is processing of non-uniformly superimposing a layer of a clear toner on a layer of a color toner such that the toner surface after fixing becomes irregular for the purpose of matting (matte tone).

When the way to superimpose the CLR color is changed, the RGB read values of the test image data vary. Therefore, in the second embodiment, the master image data is generated while taking the way to superimpose the CLR color (the way of the processing using a clear toner) into account.

Figure 8:
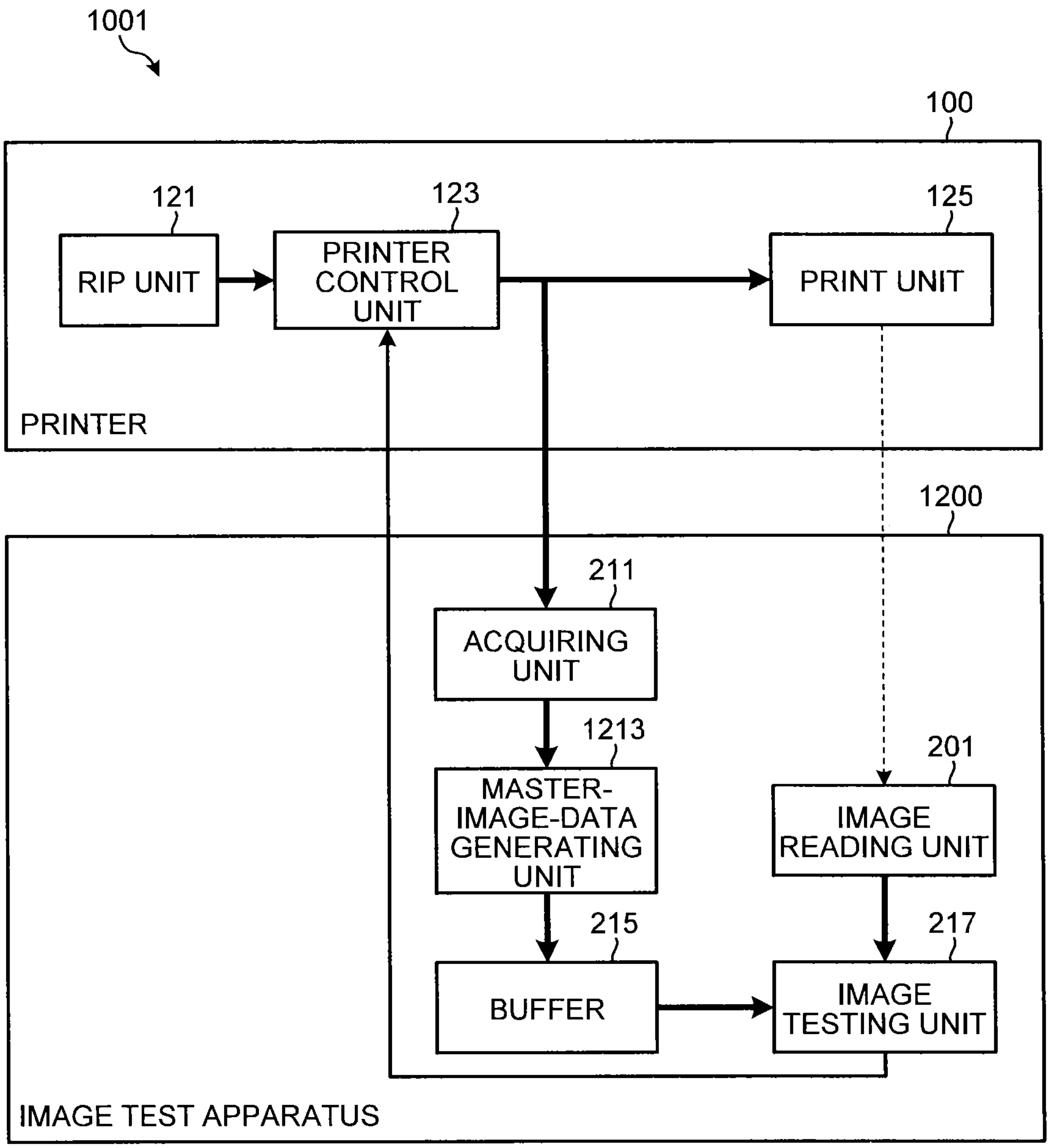
FIG. 8 is a block diagram of a configuration example of a printer and an image test apparatus according to the second embodiment.

FIG. 8 is a block diagram of a configuration example of the printer 100 and an image test apparatus 1200 according to the second embodiment. As illustrated in FIG. 8, in the second embodiment, a master-image-data generating unit 1213 of the image test apparatus 1200 of an image test system 1001 is different from the first embodiment.

The master-image-data generating unit 1213 detects number of lines in transparent image data and converts color image data depending on the detected number of lines in the transparent image data, thereby generating master image data.

Figure 9:
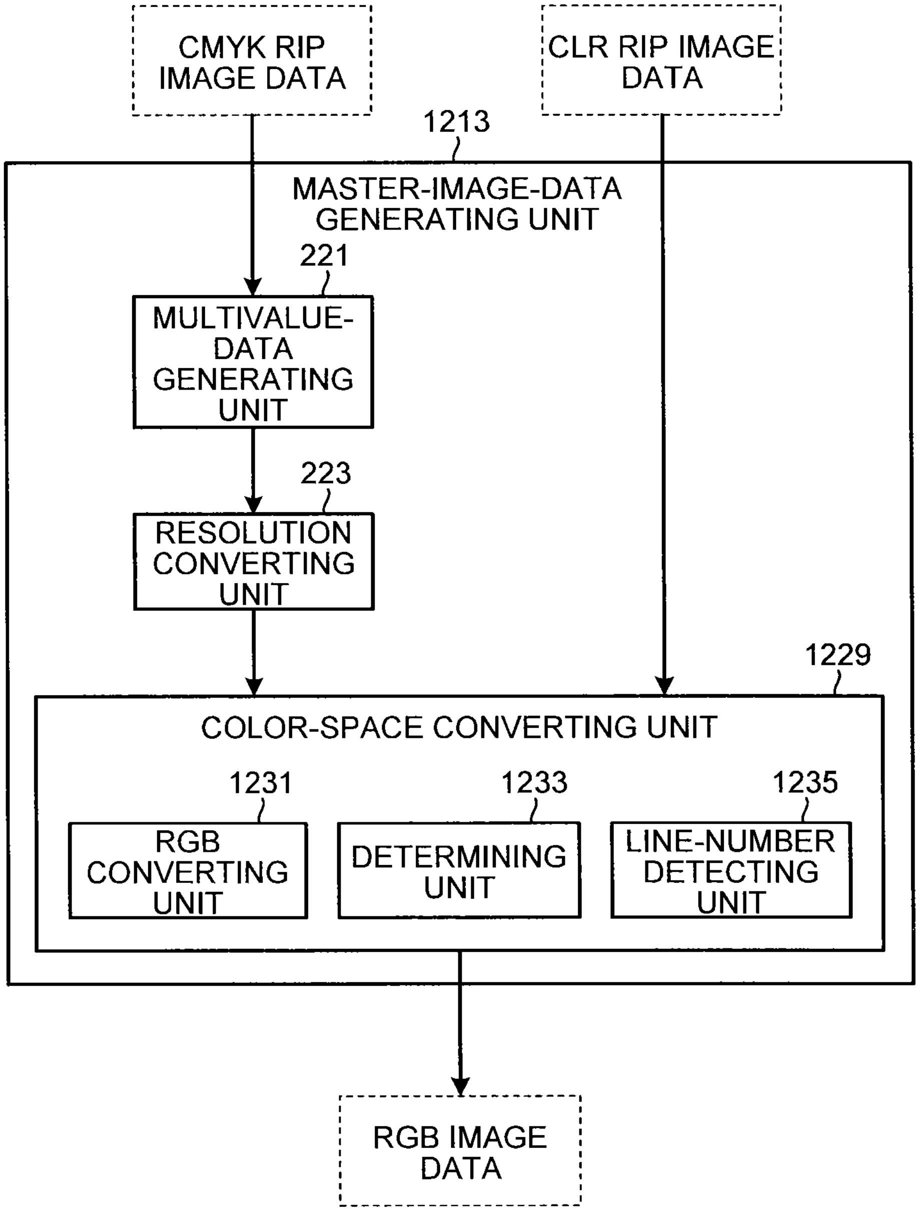
FIG. 9 is a block diagram of a detailed configuration example of a master-image-data generating unit according to the second embodiment.

FIG. 9 is a block diagram of a detailed configuration example of the master-image-data generating unit 1213 according to the second embodiment. As illustrated in FIG. 9, the second embodiment is different from the first embodiment in that a color-space converting unit 1229 of the master-image-data generating unit 1213 further includes a line-number detecting unit 1235, and a RGB converting unit 1231 and a determining unit 1233 perform different processes from those of the first embodiment.

The line-number detecting unit 1235 detects whether the CLR RIP image data contains fine halftone dots or rough halftone dots as a result of halftone processing. The line-number detecting unit 1235 may detect the number of lines by using a result of laplacian filter as feature value or may detect the number of lines by using a pattern matching method or the like.

The determining unit 1233 determines whether a clear toner is present or absent in the test image data and the way of the processing using a clear toner, on the basis of a result of detecting the number of lines by the line-number detecting unit 1235. The determining unit 1233 has grid-point parameters in a case where the gloss processing is performed, grid-point parameters in a case where the matte processing is performed, and grid-point parameters in a case where CLR is not superimposed. When determining, for example, that the number of detected lines is 0 and the clear color is not used in the test image data, the determining unit 1233 outputs the grid-point parameters in the case where CLR is not superimposed, to the RGB converting unit 1231. When, for example, the number of detected lines is greater than 0 and equal to or smaller than a threshold, the determining unit 1233 determines that the matte processing has been performed on the test image data and outputs the grid-point parameters in the case where the matte processing is performed, to the RGB converting unit 1231. When, for example, the number of detected lines is greater than the threshold, the determining unit 1233 determines that the gloss processing has been performed on the test image data and outputs the grid-point parameters in the case where the gloss processing is performed, to the RGB converting unit 1231.

When the grid-point parameters in the case where CLR is not superimposed are input from the determining unit 1233, the RGB converting unit 1231 obtains data of a set of RGB values based on the grid-point parameters from data of a set of CMYK values. When the grid-point parameters in the case where the matte processing is performed are input from the determining unit 1233, the RGB converting unit 1231 obtains data of a set of RGB values based on the grid-point parameters from data of a set of CMYK values. When the grid-point parameters in the case where the gloss processing is preformed are input from the determining unit 1233, the RGB converting unit 1231 obtains data of a set of RGB values based on the grid-point parameters from data of a set of CMYK values.

As described above, according to the second embodiment, the master image data is generated while taking a usage purpose of clear data (the way of the processing using a clear toner) into account. Therefore, even when the image test is performed on a printed matter which is printed while using a clear color, it is possible to prevent reduction in the test accuracy, enabling to perform the image test with higher accuracy.

Third Embodiment

In a third embodiment, a case will be explained that the master image data is generated depending on attribute information. In the following, a difference from the first embodiment will be mainly explained while components having functions similar to those of the first embodiment are denoted by the same names and the same symbols and explanation of such components will be omitted.

Figure 10:
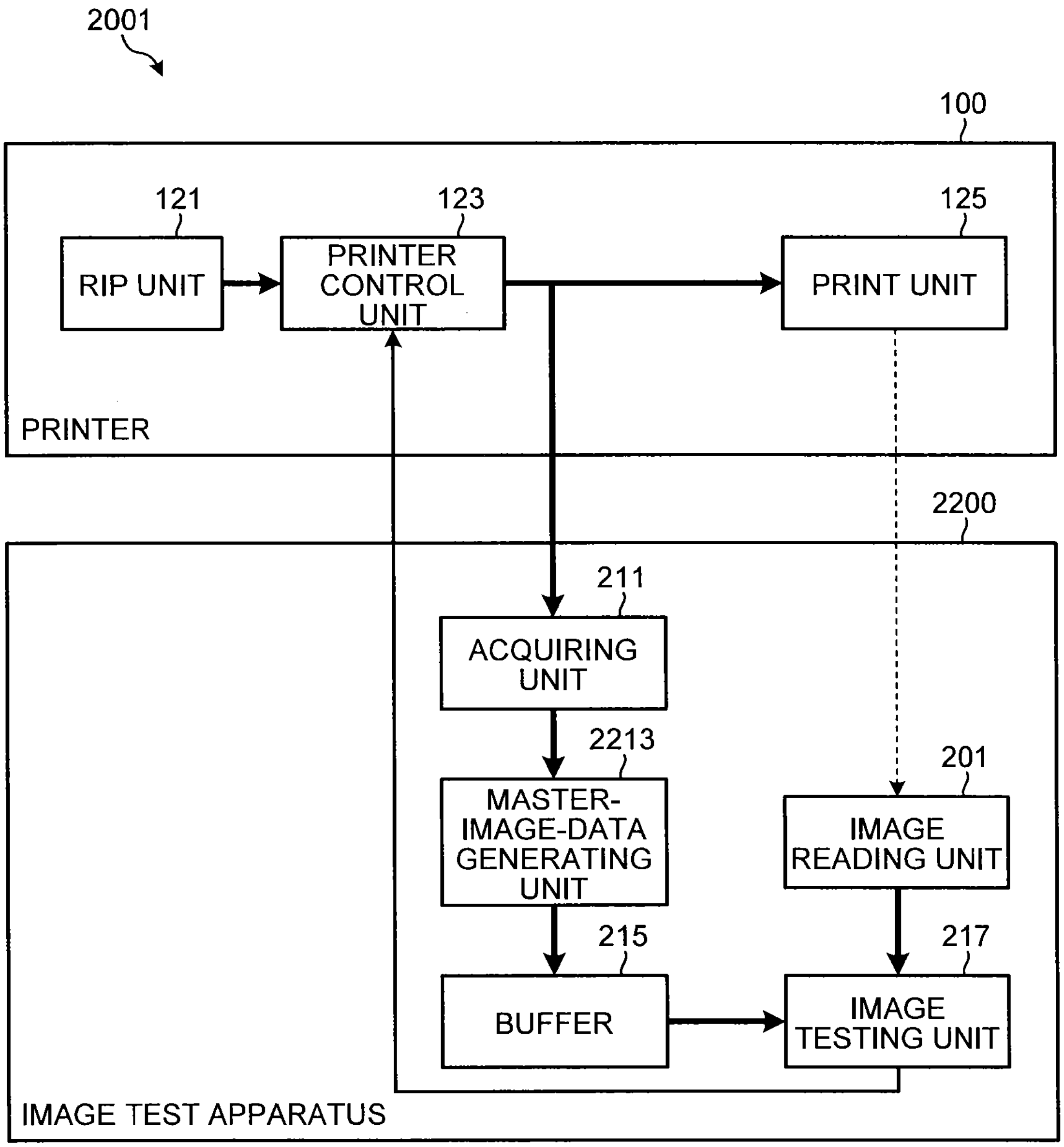
FIG. 10 is a block diagram of a configuration example of a printer and an image test apparatus according to a third embodiment.

FIG. 10 is a block diagram of a configuration example of the printer 100 and an image test apparatus 2200 according to the third embodiment. As illustrated in FIG. 10, in the third embodiment, a master-image-data generating unit 2213 of the image test apparatus 2200 of an image test system 2001 is different from the first embodiment.

The master-image-data generating unit 2213 converts color image data depending on attribute information acquired by the acquiring unit 211, thereby generating master image data.

Figure 11:
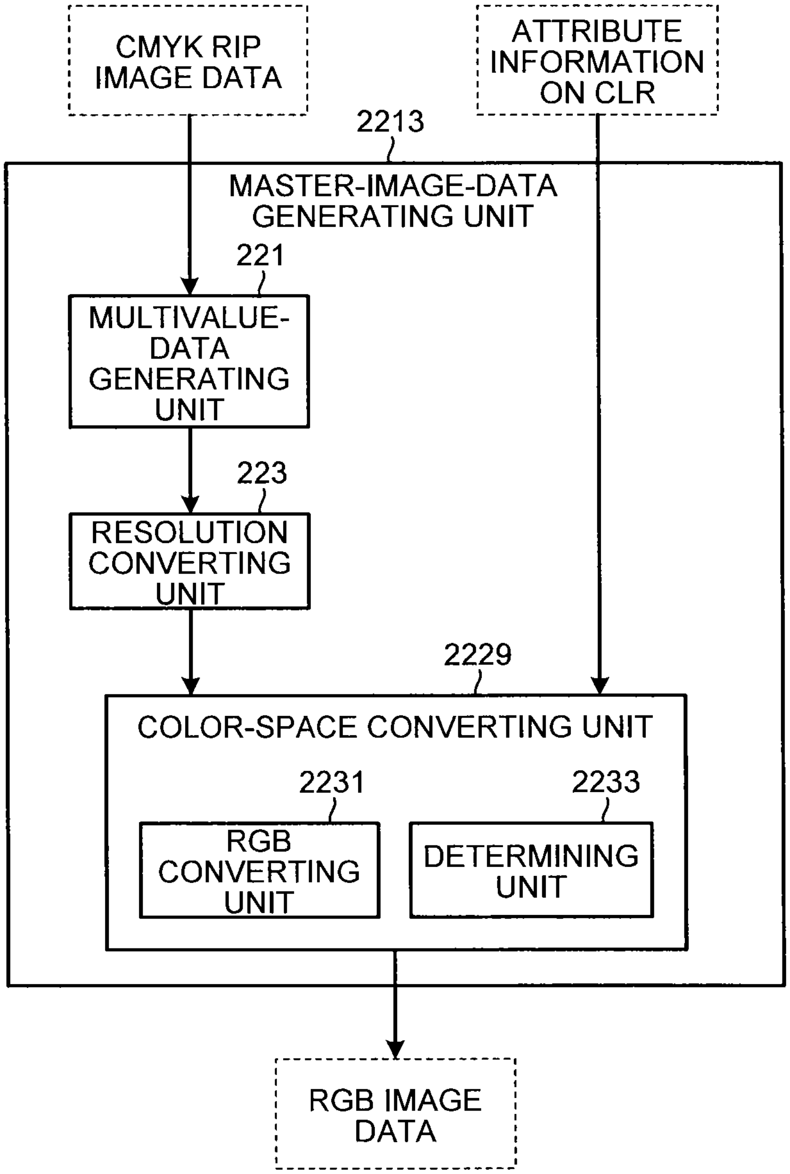
FIG. 11 is a block diagram of a detailed configuration example of a master-image-data generating unit according to the third embodiment.

FIG. 11 is a block diagram of a detailed configuration example of the master-image-data generating unit 2213 according to the third embodiment. As illustrated in FIG. 11, the third embodiment is different from the first embodiment in that a RGB converting unit 2231 and a determining unit 2233 of a color-space converting unit 2229 of the master-image-data generating unit 2213 perform processes different from the first embodiment.

The determining unit 2233 determines presence or absence of a clear color in the test image data and the way of processing using a clear toner on the basis of the attribute information transmitted from the printer 100. The attribute information is 2-bit information and indicates whether a case where CLR is not superimposed, a case where gloss processing is performed, a case where matte processing is performed, or a case where degloss processing is performed is going on. The resolution converting unit 223 holds grid-point parameters in the case where the gloss processing is performed, grid-point parameters in the case where the matte processing is performed, grid-point parameters in the case where the degloss processing is performed, and grid-point parameters in the case where CLR is not superimposed. When determining from the attribute information that the clear color is not used in the test image data, the determining unit 2233 outputs the grid-point parameters in the case where CLR is not superimposed, to the RGB converting unit 2231. When determining from the attribute information that the matte processing has been performed on the test image data, the determining unit 2233 outputs the grid-point parameters in the case where the matte processing is performed, to the RGB converting unit 2231. When determining from the attribute information that the degloss processing has been performed on the test image data, the determining unit 2233 outputs the grid-point parameters in the case where the degloss processing is performed, to the RGB converting unit 2231. When determining from the attribute information that the gloss processing has been performed on the test image data, the determining unit 2233 outputs the grid-point parameters in the case where the gloss processing is performed, to the RGB converting unit 2231.

When the grid-point parameters in the case where CLR is not performed are input from the determining unit 2233, the RGB converting unit 2231 obtains data of a set of RGB values based on the grid-point parameters from data of a set of CMYK values. When the grid-point parameters in the case where the matting processing is performed are input from the determining unit 2233, the RGB converting unit 2231 obtains data of a set of RGB values based on the grid-point parameters from data of a set of CMYK values. When the grid-point parameters in the case where the degloss processing is performed are input from the determining unit 2233, the RGB converting unit 2231 obtains data of a set of RGB values based on the grid-point parameters from data of a set of CMYK values. When the grid-point parameters in the case of the gloss processing is performed are input from the determining unit 2233, the RGB converting unit 2231 obtains data of a set of RGB values based on the grid-point parameters from data of a set of CMYK values.

As described above, in the third embodiment, the master image data is generated while taking the usage purpose of clear data (the way of processing using a clear toner) into account. Therefore, even when the image test is performed on a printed matter which is printed by using a clear color, it is possible to prevent reduction in the test accuracy, enabling to perform the image test with higher accuracy.

Modification

The present invention is not limited to the above embodiments and various changes are possible. In the above embodiments, the printer is explained as an example of the image forming apparatus; however, it is not limited thereto. The image forming apparatus may be, for example, a multifunction peripheral (MFP) having at least two functions from among a printing function, a copying function, a scanner function, and a facsimile function.

Hardware Configuration

Figure 12:
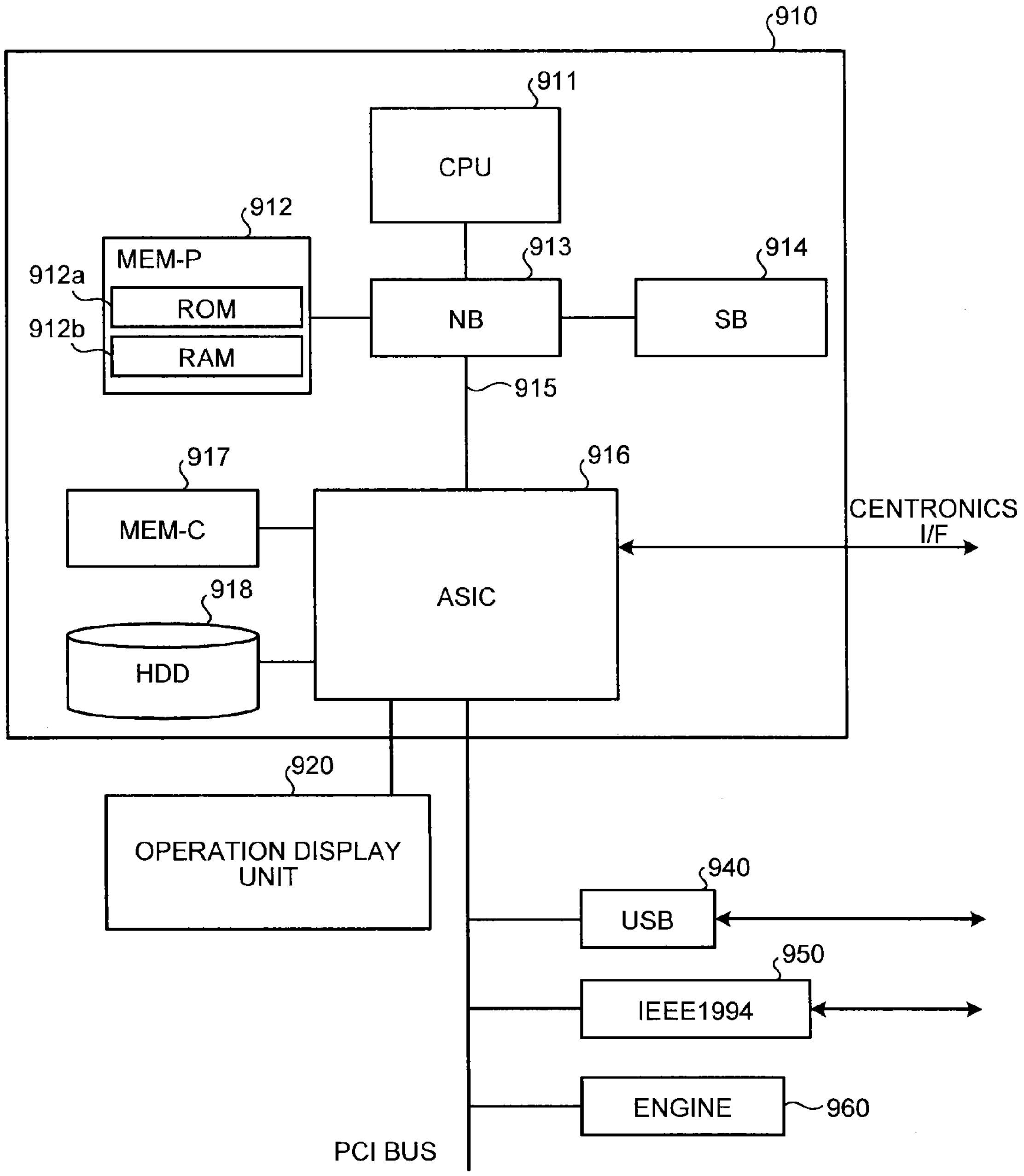
FIG. 12 is a block diagram of a hardware configuration example of the printer of each of the embodiments.

FIG. 12 is a block diagram of a hardware configuration example of the printer 100 of the above embodiments.

As illustrated in FIG. 12, the printer 100 includes a controller 910 and an engine unit (ENGINE) 960, which are connected to each other via a peripheral component interconnect (PCI) bus. The controller 910 is a controller that controls the entire printer 100, and controls drawing, communications, and input from an operation display unit 920. The engine unit 960 is an engine connectable to the PCI bus, and is, for example, a printer engine such as a monochrome plotter, a one-drum color plotter, or a four-drum color plotter. The engine unit 960 includes a section for image processing such as error diffusion or gamma correction, in addition to a section of the engine.

The controller 910 includes a CPU 911, a north bridge (NB) 913, a system memory (MEM-P) 912, a south bridge (SB) 914, a local memory (MEM-C) 917, an ASIC (Application Specific Integrated Circuit) 916, and a hard disk drive (HDD) 918. The north bridge (NB) 913 and the ASIC 916 are connected via an AGP (Accelerated Graphics Port) bus 915. The MEM-P 912 includes a ROM 912*a* and a RAM 912*b*.

The CPU 911 controls the entire printer 100, includes a chip set including the NB 913, the MEM-P 912, and the SB 914, and is connected to other devices via the chip set.

The NB 913 is a bridge to connect the CPU 911 to the MEM-P 912, the SB 914, and the AGP bus 915 to one another. The NB 913 includes a memory controller to control read from and write to the MEM-P 912, and also includes a PCI master and an AGP target.

The MEM-P 912 is a system memory used as a memory to store a computer program and data, a memory to deploy computer program and data, and a memory for drawing performed by a printer. The MEM-P 912 includes the ROM 912*a* and the RAM 912*b*. The ROM 912*a* is a read-only memory used for storing computer programs and data. The RAM 912*b* is a writable and readable memory used as a memory to deploy a computer program and data or a memory for drawing performed by a printer.

The SB 914 is a bridge to connect the NB 913 to a PCI device and/or a peripheral device. The SB 914 is connected to the NB 913 via the PCI bus, to which a network interface (I/F) or the like is also connected.

The ASIC 916 is an IC (Integrated Circuit) that is customized for image processing and includes a hardware element for image processing, and has a function as a bridge to connect the AGP bus 915, a PCI bus, the HDD 918, and the MEM-C 917 to one another. The ASIC 916 includes: a PCI target and an AGP master; an arbiter (ARB) that is the core of the ASIC 916; a memory controller that controls the MEM-C 917; a plurality of DMACs (Direct Memory Access Controllers) that performs rotation of image data or the like using hardware logic or the like; and a PCI unit that performs data transfer to and from the engine unit 960 via the PCI bus. A USB (Universal Serial Bus) 940, an IEEE 1394 (Institute of Electrical and Electronics Engineers 1394) interface (I/F) 950 are connected to the ASIC 916 via the PCI bus. The operation display unit 920 is directly connected to the ASIC 916.

The MEM-C 917 is a local memory for use as a copy image buffer and a code buffer. The HDD 918 is a storage device to store image data, a computer program, font data, and a form.

The AGP bus 915 is a bus interface for a graphics accelerator card introduced to speed up graphics operations and directly accesses the MEM-P 912 with a high throughput, thereby speeding up operations related to the graphic accelerator card.

The image test apparatus described in the above embodiments has a hardware configuration using a normal computer and includes a control device, such as a central processing unit (CPU); a storage device, such as a ROM or a RAM; an external storage device, such as a HDD or a SSD; a display device, such as a display; an input device, such as a mouse or a keyboard; and a communication device, such as a communication I/F.

An image test program executed by the image test apparatus of the above embodiments is provided by being stored in a ROM or the like in advance.

The image test program executed by the image test apparatus of the above embodiments may be provided by being recorded in a computer-readable recording medium, such as a CD-ROM, a flexible disk (FD), a CD-R, or a digital versatile disk (DVD), in a computer-installable or a computer-executable file format.

The image test program executed by the image test apparatus of the above embodiments may be stored in a computer connected to a network, such as the Internet, and provided by being downloaded via the network. The image test program executed by the image test apparatus of the above embodiments may be provided or distributed via a network, such as the Internet.

The image test program executed by the image test apparatus of the above embodiments has a module structure such that the above units are realized on a computer. As actual hardware, the CPU reads the program from the ROM onto the RAM and executes the program to realize the above units on the computer.

According to one embodiment of the present invention, it is possible to prevent reduction in the test accuracy even when an image test is performed on a printed matter which is printed while using a clear color.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image test apparatus comprising:

a color-image-data acquiring unit that acquires color image data being data of an image to be formed with a color material;

a master-image-data generating unit that converts the color image data depending on transparent image data being data of an image to be formed with a transparent color material, thereby generating master image data; and an image testing unit that tests, using the master image data, a test image data which is generated by optically reading a print image from a printed matter on which the print image based on the color image data and the transparent image data has been printed, wherein the master-image-data-generating unit includes a first multivalue-data generating unit that converts the color image data to multivalue color image data, a second multivalue-data generating unit that converts the transparent image data to multivalue transparent color image data, a determining unit that determines whether or not clear color is present in the image based upon the multivalue transparent color image data, and a converting unit that converts the multivalue color image data to generate the master image data according to a determination result of the determining unit.

2. The image test apparatus according to claim 1, further comprising:

a transparent-image-data acquiring unit that acquires the transparent image data, wherein the master-image-data generating unit generates the master image data by converting the color image data depending on the transparent image data.

3. The image test apparatus according to claim 2, wherein the master-image-data generating unit generates the master image data by detecting number of lines in the transparent image data and converting the color image data depending on the number of lines detected in the transparent image data.

4. The image test apparatus according to claim 1, further comprising:

an attribute-information acquiring unit that acquires attribute information indicating attribute of the transparent image data, wherein the master-image-data generating unit generates the master image data by converting the color image data depending on the attribute information.

5. The image test apparatus according to claim 1, wherein the master-image-data-generating unit further includes:

a first resolution converting unit that converts a resolution of the multivalue color image data, and a second resolution converting unit that converts a resolution of the multivalue transparent color image data.

6. The image test apparatus according to claim 1, wherein the converting unit converts the multivalue color image data to generate the master image data based upon grid-point parameters according to the determination result of the determining unit.

7. An image test system comprising:

an image forming apparatus that includes a color-image-data generating unit that generates color image data being data of an image to be formed with a color material;

a transparent-image-data generating unit that generates transparent image data being data of an image to be formed with a transparent material; and a printing unit that prints a print image on a recording medium based on the color image data and the transparent image data, thereby generating a printed matter; and an image test apparatus that includes a color-image-data acquiring unit that acquires the color image data;

a master-image-data generating unit that converts the color image data depending on the transparent image data, thereby generating a master image data;

an image reading unit that optically reads the print image from the printed matter, thereby generating a test image data; and an image testing unit that tests the test image data using the master image data, wherein the master-image-data-generating unit includes a first multivalue-data generating unit that converts the color image data to multivalue color image data, a second multivalue-data generating unit that converts the transparent image data to multivalue transparent color image data a determining unit that determines whether or not clear color is present in the image based upon the multivalue transparent color image data, and a converting unit that converts the multivalue color image data to generate the master image data according to a determination result of the determining unit.

8. The image test system according to claim 7, wherein the master-image-data-generating unit further includes:

a first resolution converting unit that converts a resolution of the multivalue color image data, and a second resolution converting unit that converts a resolution of the multivalue transparent color image data.

9. The image test system according to claim 7, wherein the converting unit converts the multivalue color image data to generate the master image data based upon grid-point parameters according to the determination result of the determining unit.

10. An image test method comprising:

acquiring, by a color-image-data acquiring unit, color image data being data of an image to be formed with a color material;

generating, by a master-image-data generating unit, a master image data by converting the color image data depending on transparent image data being data of an image to be formed with a transparent color material; and testing, by an image testing unit, a test image data which is generated by optically reading a print image from a printed matter on which the print image based on the color image data and the transparent image data has been printed, using the master image data, wherein generating, by the master-image-data-generating unit, the master image data includes converting, by a first multivalue-data generating unit, the color image data to multivalue color image data, converting, by a second multivalue-data generating, the transparent agent image data to multivalue transparent color image data, determining, by a determining unit, whether or not clear color is present in the image based upon the multivalue transparent color image data, and converting, by a converting unit, the multivalue color image data to generate the master image data according to a determination result of the determining.

11. The image test method according to claim 10, wherein generating, by the master-image-data-generating unit, the master image data further includes:

converting, by a first resolution converting unit, a resolution of the multivalue color image data, and converting, by a second resolution converting unit, a resolution of the multivalue transparent color image data.

12. The image test method according to claim 10, wherein converting, by the converting unit, includes converting the multivalue color image data to generate the master image data based upon grid-point parameters according to the determination result of the determining.

* * * * *